United States Patent
Dawson et al.

(10) Patent No.: US 11,563,509 B2
(45) Date of Patent: Jan. 24, 2023

(54) ELECTRONICALLY STEERABLE PARASITIC ARRAY ANTENNA PROCESS

(71) Applicant: Naval Information Warfare Center Pacific, San Diego, CA (US)

(72) Inventors: David Carlos Dawson, Lemon Grove, CA (US); Ricardo Santoyo-Mejia, Chula Vista, CA (US); Ronald B Thompson, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 177 days.

(21) Appl. No.: 17/210,634

(22) Filed: Mar. 24, 2021

(65) Prior Publication Data
US 2022/0311535 A1    Sep. 29, 2022

(51) Int. Cl.
*G01S 19/15* (2010.01)
*H04K 3/00* (2006.01)
*G01S 19/01* (2010.01)

(52) U.S. Cl.
CPC .............. *H04K 3/86* (2013.01); *G01S 19/015* (2013.01)

(58) Field of Classification Search
CPC .................. H04K 3/86; G01S 19/015
USPC ........................................ 455/305
See application file for complete search history.

(56) References Cited

U.S. PATENT DOCUMENTS 8,963,774 B1 *  2/2015  Livadaru ............... H01Q 3/446
                                                342/374

\* cited by examiner

*Primary Examiner* — Shaima Q Aminzay
(74) *Attorney, Agent, or Firm* — Naval Information Warfare Center, Pacific; Kyle Eppele; Matthew D. Pangallo

(57) ABSTRACT

A process for an electronically steerable parasitic array (ESPAR) antenna includes operating the ESPAR antenna with a receiver in Normal Mode until an internal flag is generated by the receiver indicating jamming RF noise preventing Normal Mode operation, causing the ESPAR antenna to switch to Anti-jam Mode. Anti-jam Mode includes a Search Mode and a Track Mode. The ESPAR antenna is steered in Search Mode, causing the ESPAR antenna to beam in a circular pattern to locate a spatial direction of the jamming RF noise, identify the spatial direction of the jamming RF noise preventing Normal Mode operation, and place a null in the spatial direction of the jamming RF noise. The ESPAR antenna switches to Track Mode to maintain the null in the spatial direction of the jamming RF noise until the jamming RF noise is not present. The ESPAR antenna then returns to operating in Normal Mode.

20 Claims, 2 Drawing Sheets

ELECTRONICALLY STEERABLE PARASITIC ARRAY ANTENNA PROCESS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND

Beamforming antennas use an array of antennas, or array of quasi-antenna elements to modify the directionality of signal transmission and signal reception. The directionality of a beamforming antenna may be controlled by modifying the phase and relative amplitude of the signal at each antenna element. By modifying the phase and amplitude of each individual element, a beam or a null can be created and modified. In some techniques, beam steering can be achieved by modifying the signal phase in real time without moving the antenna elements or other antenna hardware. Beamforming is used in many applications, such as radar, sonar, seismology, wireless communications, radio astronomy, acoustics, and biomedicine.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

Nullforming or beamforming antennas can have many different architectures. In particular, aerial beamforming antennas have a design advantage over other antenna architectures because these antennas only require input from a single antenna while some other architectures require multiple antennas to properly function. However, aerial beamforming antennas cannot have parallel processing for beamforming. Therefore, aerial beamforming antennas require specialized processes to function.

In the process and system herein, a specific type of beamforming antenna called an electronically steerable parasitic array (ESPAR) antenna is used. The process provides an operating procedure for the ESPAR antenna, particularly for ESPAR antennas that use aerial beamforming. The ESPAR antenna independently finds the direction of arrival (DoA) of jamming radiofrequency (RF) noise after using a receiver to determine that the RF noise is too high to receive a signal. The process allows the ESPAR antenna to search the environment, find the spatial point of interest, and adapt accordingly. The process also allows the ESPAR antenna to track the point of interest in a continuous uninterrupted operation.

The process for an ESPAR antenna herein includes operating the ESPAR antenna with a receiver in Normal Mode until an internal flag is generated by the receiver indicating jamming RF noise preventing Normal Mode operation, causing the ESPAR antenna to switch to Anti jam Mode. Anti-jam Mode includes a Search Mode and a Track Mode. The ESPAR antenna is steered in Search Mode, causing the ESPAR antenna to beam in a circular pattern to locate a spatial direction of the jamming RF noise, identify the spatial direction of the jamming RF noise preventing Normal Mode operation, and place a null in the spatial direction of the jamming RF noise. Once the null is placed, the ESPAR antenna switches to Track Mode to continuously maintain the null in the spatial direction of the jamming RF noise until the jamming RF noise is not present, which causes the ESPAR antenna to return to operating in Normal Mode.

Figure 1:
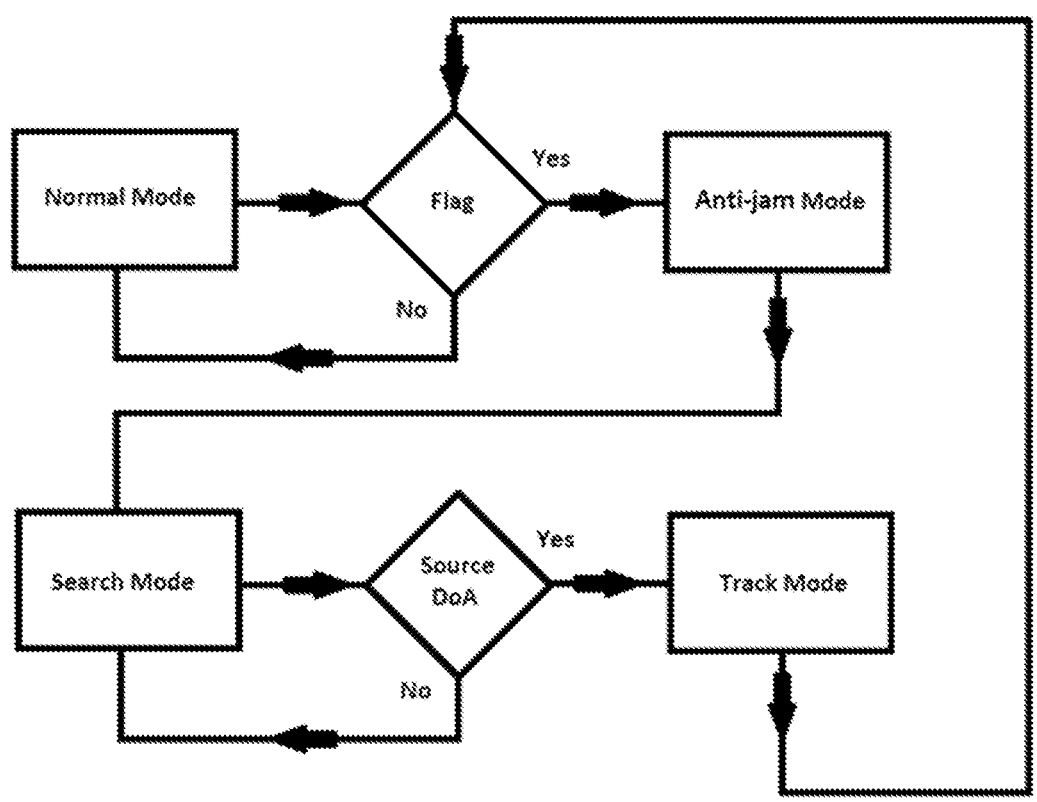
FIG. 1 is a block diagram illustrating an example of the process for an electronically steerable parasitic array antenna described herein.

Referring now to FIG. 1, a block diagram illustrates an example of the process for the ESPAR antenna. The ESPAR antenna operates with a receiver in Normal Mode until an internal flag is generated by the receiver indicating jamming RF noise preventing Normal Mode operation. The ESPAR antenna is in Normal Mode when operating unless a flag is generated. Normal Mode is when the ESPAR antenna is receiving signals omnidirectionally. In an example, the ESPAR antenna may only receive signals and does not transmit any signals. In another example, the ESPAR antenna transmits and receives signals. In examples, where the ESPAR antenna transmits and receives signals, locators may be used to interrogate devices for their location via commercial satellite constellations. In some examples, the ESPAR antenna may be attached to or within a mobile platform that is capable of movement. Some examples include an aerial vehicle (e.g., an airplane), a ground vehicle (e.g., a car or train), a portable item (e.g., a cellular telephone), a portable GPS receiver, or other satellite receivers.

A flag is an internal signal generated by the receiver in response to the jamming RF noise that prevents the receiver from operating. The flag generated by the receiver causes the ESPAR antenna to switch to Anti-jam mode. This is also shown in FIG. 1. Jamming RF noise is understood as RF noise that exceeds the ability of the receiver to reconstruct signals. The jamming RF noise levels a receiver can withstand varies depending on a number of factors, such as the type of receiver being used, the distance to the source producing the RF noise, and the sensitivity of the receiver. Therefore, the jamming RF noise is scenario specific and determined during operation. Jamming RF noise can be generated deliberately by, for example, a jammer or unintentionally. Unintentional RF noise can also be coming from any device that generates an RF signal significant enough to interfere with the operation of the receiver. Some examples of jamming RF noise include noise generated from a jammer, ambient interfering RF noise, or a combination thereof.

The receiver may be embedded within the ESPAR antenna or may be connected to the ESPAR antenna as a separate component. The receivers may operate in any mode of operation. For example, the receivers may operate in differential GPS (DGPS) mode or real-time kinematic (RTK) GPS mode. Some examples of the receiver include a Global Navigation Satellite System (GNSS) receiver, GLONASS, Galileo, BeiDou satellite constellations, and combinations thereof. If a combination of receivers are used, the ESPAR antenna output can use a splitter to feed additional receivers.

Referring back to FIG. 1, once a flag is generated, the ESPAR antenna switches to Anti-jam Mode. The Anti-jam Mode includes a Search Mode and a Track Mode. First, Search Mode is activated to find the spatial direction of the jamming RF noise that is preventing proper reception of the receiver. As such, Search Mode entails steering the ESPAR antenna and beaming the ESPAR antenna in a circular pattern to locate the spatial direction of the jamming RF noise, identify the spatial direction of the jamming RF noise preventing Normal Mode operation, and placing a null in the spatial direction of the jamming RF noise.

In order to find the source of the jamming RF noise, the ESPAR antenna is steerable in a 360° direction in azimuth. The rotation of the ESPAR antenna is accomplished with an array of parasitic elements with (360/the array of parasitic elements)° of rotational freedom. In an example, the array of parasitic elements may be as many parasitic elements that can physically fit within the ESPAR antenna, where the higher the number of parasitic elements, the more accuracy the ESPAR antenna has in identifying the spatial direction of RF noise. In another example, the array of parasitic elements is 10, and the ESPAR antenna has 36° of rotational freedom.

The circular pattern used in Search Mode is used to distinguish the noise coming from a specific direction while general noise is coming from all directions. The circular pattern may be any pattern that generates a beam that can successfully search for and identify the spatial direction of the jamming RF noise. In an example, the Search Mode includes one or more beams or nulls placed by the ESPAR antenna in a doughnut cross-section-shaped radiation pattern, a cardioid-shaped radiation pattern, or a combination thereof. In another example, Search Mode includes a radiation pattern with two beams or two nulls to determine the direction of arrival of the jamming RF noise. One or more null patterns may be saved in the memory of a central processing unit described herein and accessed when Search Mode is activated.

Referring to FIG. 1, Search Mode is used to identify the spatial direction of the jamming RF noise that is jamming the ESPAR antenna reception, which is shown as "Source DoA" (i.e., source direction of arrival). In general, Search Mode may use any known electronic steering method to identify the spatial direction of the jamming RF noise. In an example, the Search Mode uses an electronic steering method selected from group consisting of a brute force search, a Bayesian Search Theory, or historical data. Historical data can be any data or database that is accessible and contains known locations of jammers that produce jamming RF noise. In another example, in a brute force search, the Search Mode uses one or more nulls in a multiple directions to test whether the jamming RF noise is blocked and proper reception is reestablished. The null may be one narrow and deep null for each spatial direction of the jamming RF noise preventing reception of the ESPAR antenna. Once the jamming RF noise is located, a null is placed in the spatial direction of the jamming RF noise to reestablish reception of the receiver.

Referring back to FIG. 1, once a null is placed in the spatial direction of the jamming RF noise, the ESPAR antenna switches to Track Mode. In Track Mode, the ESPAR antenna continuously maintains a null in the spatial direction of the jamming RF noise until the jamming RF noise is not present. Once the jamming RF noise is no longer present, the ESPAR antenna switches back to operating in Normal Mode. In order to determine whether the jamming RF noise is still present in Track Mode, the ESPAR antenna periodically switches between Normal Mode and Search mode. Switching between Normal Mode and Search Mode verifies the jamming RF noise is still present when in Normal Mode and continuously maintaining the null or beam in the spatial direction of the jamming RF noise (i.e., constantly negates the jamming RF noise) when in Search Mode until the jamming RF noise is not present while in Normal Mode. In essence, while in Track Mode, the ESPAR antenna continuously repeats Normal Mode and Search Mode to follow the spatial direction of the jamming RF noise until there is no jamming RF noise interfering with the ESPAR antenna when in Normal mode (i.e., no internal flag is being generated by the receiver while in Normal Mode). Once the jamming RF noise is not present, the ESPAR antenna switches to and remains in Normal Mode until a new flag is generated in response to a new source of jamming RF noise as shown in FIG. 1.

The process described herein can be performed by preprograming a central processing unit to perform all the functions described in the process herein. Any known central processing unit may be used that is capable of storing and performing all the functions of the process previously described herein. In an example, the central processing unit may be selected from the group consisting of field programmable gate arrays, application specific integrated circuits, and commercial off-the-shelf computers.

Referring to the ESPAR antenna system, the system includes a receiver, the ESPAR antenna, and a central processing unit. The ESPAR antenna, receiver, and central processing unit are the same ESPAR antenna, receiver, and central processing unit previously described herein. The ESPAR antenna may be any known ESPAR antenna that can perform all of the functions previously described herein.

To further illustrate the present disclosure, examples are given herein. These examples are provided for illustrative purposes and are not to be construed as limiting the scope of the present disclosure.

EXAMPLES

Example 1: Basic Search Mode

Figure 2:
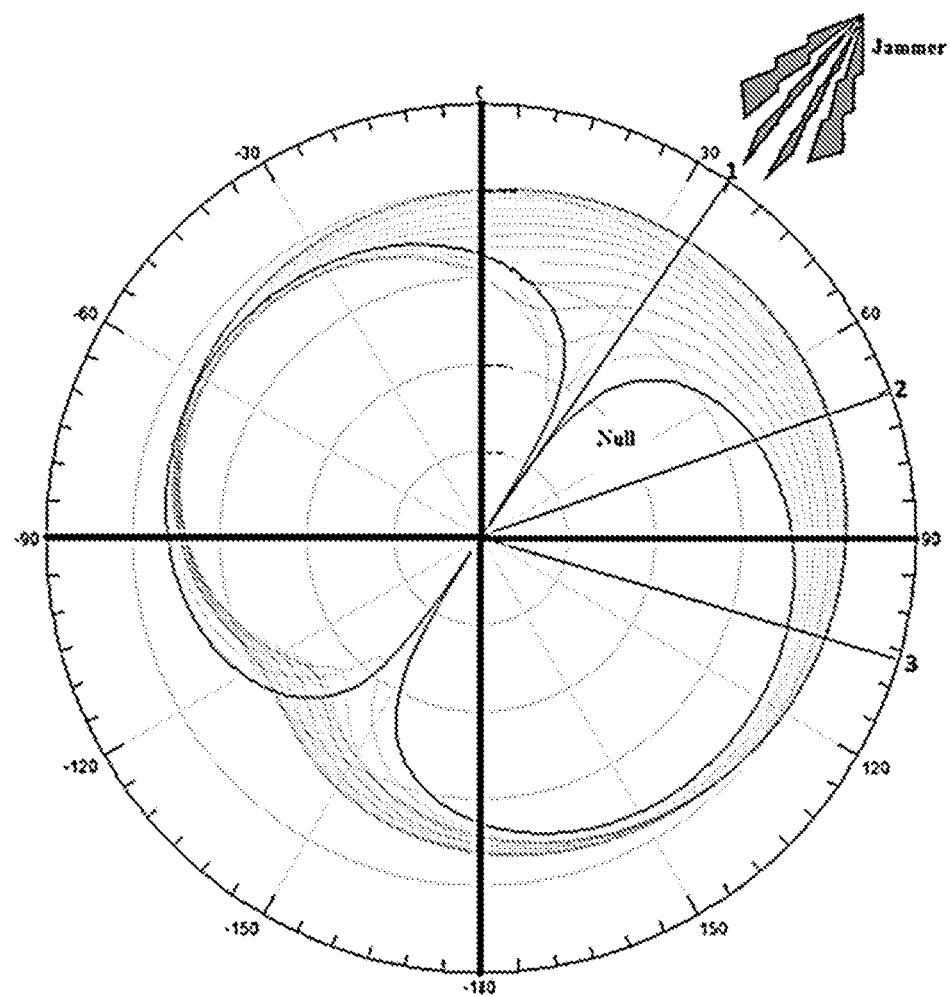
FIG. 2 is an example of a doughnut shaped radiation pattern emitted by the electronically steerable parasitic array antenna to determine the location of a jammer.

FIG. 2 shows a theoretical example of the process for the ESPAR antenna. In FIG. 2, a doughnut cross-section-shaped radiation pattern is used. The ESPAR antenna has an initial position in which the nulls are aligned north to south and the array has 10 parasitic elements (i.e., 10 steerable positions every 36 degrees). The Search Mode in the process herein can locate the direction of a jammer using a maximum of ten steps, in milliseconds. Ten positions are sampled with the beam.

In one example, in a two-step search, the top null goes from 0° to 36° and the bottom null goes from 180° to 216°. If the location of the jammer is intercepted, there will be a bearing ambiguity between the Northeast and Southwest quadrants. It will not be known if the jammer is located at 36° or 216°. A single null radiation pattern in either direction (0° to 36° or 180° to 216° will solve for this ambiguity in a single step, since there is a 50% chance of guessing the right location.

In a three-step search, if the jammer was located around 72°, in position 2, the search would take one additional step. Specifically, the initial step described above in the two-step approach would occur, along with another step where the top null goes from 36° to 72° and the bottom null goes from 216° to 252°. Once the jammer is found, an additional step of a single null radiation pattern in either (36° to 72° or 216° to 252°) direction would occur to solve for bearing ambiguity.

In a four-step search, if the jammer happens to be located at around 108°, in position 3, the search would take one additional step. In particular, the initial steps of scanning from 0° to 36° and 36° to 72° for the top null would occur. Also, the initial steps of scanning from 180° to 216° and 216° to 252° would occur for the bottom null. After those initial steps, if the jammer has not been found, the top null would scan from 72° to 108° and the bottom null would scan from 252° to 288°. Once the jammer is found an additional step of a single null radiation pattern in either direction (72° to 108° or 252° to 288°) would occur to solve for bearing ambiguity.

At this point, the nulls will have covered 360° and determined the approximate location of the jammer. This location can then be used to place a single wide null radiation pattern and counteract the effects of the jammer. If the basic Search Mode is unable to locate the direction of the jammer after a number of trials, a secondary search mode can be used with a different radiation patterns.

In another example, the ESPAR antenna has the same initial position in which the nulls are aligned north to south and the array has 10 parasitic elements (i.e., 10 steerable positions every 36 degrees). The same Search Mode is used to find the direction of a jammer using ten steps. Ten positions are sampled with the beam. The direction with the highest level of noise is the DoA. Once the DoA is determined, a null is placed in that direction.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 0° to about 36° should be interpreted to include not only the explicitly recited limits of from about 0° to about 36°, but also to include individual values, such as 3°, 17°, 23°, etc., and sub-ranges, such as from about 5° to about 15°, etc.

In describing and claiming the examples disclosed herein, the singular forms "a", "an", and "the" include plural referents unless the context clearly dictates otherwise.

What is claimed is:

1. A process for an electronically steerable parasitic array (ESPAR) antenna, comprising:
   operating the ESPAR antenna with a receiver in Normal Mode until an internal flag is generated by the receiver indicating jamming RF noise preventing Normal Mode operation, thereby switching the ESPAR antenna to Anti-jam Mode, wherein Anti-jam Mode includes a Search Mode and a Track Mode;
   steering the ESPAR antenna in Search Mode, thereby beaming the ESPAR antenna in a circular pattern to locate a spatial direction of the jamming RF noise, identifying the spatial direction of the jamming RF noise preventing Normal Mode operation, and placing a null in the spatial direction of the jamming RF noise; and
   switching the ESPAR antenna to Track Mode, thereby continuously maintaining the null in the spatial direction of the jamming RF noise until the jamming RF noise is not present, wherein the ESPAR antenna returns to operating in Normal Mode.

2. The process of claim 1, wherein the receiver is selected from the group consisting of a Global Navigation Satellite System (GNSS) receiver, GLONASS, Galileo, BeiDou satellite constellations, and combinations thereof.

3. The process of claim 1, wherein the jamming RF noise is generated from a jammer, ambient interfering RF noise, or a combination thereof.

4. The process of claim 1, wherein the ESPAR antenna is steerable in a 360° direction in azimuth.

5. The process of claim 1, wherein the ESPAR antenna has an array of parasitic elements with (360/the array of parasitic elements)° of rotational freedom.

6. The process of claim 1, wherein the circular pattern of the ESPAR antenna includes a doughnut cross-section-shaped, a cardioid-shaped pattern, or a combination thereof.

7. The process of claim 1, wherein the process is preprogrammed in a central processing unit selected from a group consisting of field programmable gate arrays, application specific integrated circuits, and commercial off-the-shelf computers.

8. The process of claim 1, wherein the Search Mode uses an electronic steering method to locate the jamming RF noise selected from the group consisting of a brute force search, a Bayesian Search Theory, or historical data.

9. The process of claim 1, wherein the Track Mode continuously maintains a null in the spatial direction of the jamming RF noise by switching between Normal Mode and Search Mode verifying the jamming RF noise is still present when in Normal Mode and continuously maintaining a null in the spatial direction of the jamming RF noise when in Search Mode until the jamming RF noise is not present while in Normal Mode.

10. The process of claim 1, wherein the ESPAR antenna only receives signals.

11. An electronically steerable parasitic array (ESPAR) antenna system, comprising:
    a receiver, wherein the receiver generates an internal signal indicating RF noise preventing Normal Mode operation of operation due to jamming
    the ESPAR antenna, wherein the ESPAR antenna performs the following functions:
    operating the ESPAR antenna in Normal Mode until an internal flag is generated by the receiver indicating jamming RF noise preventing Normal Mode operation, thereby switching the antenna to Anti-jam Mode, wherein the Anti-jam Mode includes a Search Mode and a Track Mode;

steering the ESPAR antenna in Search Mode, thereby beaming the ESPAR antenna in a circular pattern to locate a spatial direction of the jamming RF noise, identifying the spatial direction of the jamming RF noise preventing Normal Mode operation, and placing a null in the spatial direction of the jamming RF noise; and switching the ESPAR antenna to Track Mode, thereby continuously maintaining the null in the spatial direction of the jamming RF noise until the jamming RF noise is not present, wherein the ESPAR antenna returns to operating in Normal Mode; and a central processing unit, wherein the central processing unit is preprogrammed to run the functions of the ESPAR antenna.

12. The system of claim 11, wherein the receiver is selected from the group consisting of a Global Navigation Satellite System (GNSS) receiver, GLONASS, Galileo, BeiDou satellite constellations, and combinations thereof.

13. The system of claim 11, wherein the jamming RF noise is generated from a jammer, ambient RF noise, or a combination thereof.

14. The system of claim 11, wherein the ESPAR antenna is steerable in a 360° direction in azimuth.

15. The system of claim 11, wherein the ESPAR antenna has an array of parasitic elements with (360/the array of parasitic elements)° of rotational freedom.

16. The system of claim 11, wherein the circular pattern of the ESPAR antenna includes a doughnut-shaped pattern, a cardioid-shaped pattern, or a combination thereof.

17. The system of claim 11, wherein the Search Mode uses an electronic steering method to locate the jamming RF noise selected from the group consisting of a brute force search, a Bayesian Search Theory, or historical data.

18. The system of claim 11, wherein the Track Mode continuously maintains a null in the spatial direction of the jamming RF noise by switching between Normal Mode and Search Mode verifying the jamming RF noise is still present when in Normal Mode and continuously maintaining a null in the spatial direction of the jamming RF noise when in Search Mode until the jamming RF noise is not present while in Normal Mode.

19. The system of claim 11, wherein the central processing unit selected from a group consisting of field programmable gate arrays, application specific integrated circuits, and commercial off-the-shelf computers.

20. The system of claim 11, wherein the ESPAR antenna only receives signals.

* * * * *